US007817658B2

(12) United States Patent  (10) Patent No.: US 7,817,658 B2
Ferlitsch  (45) Date of Patent: Oct. 19, 2010

(54) SYSTEMS AND METHODS FOR PREPARING A USAGE REPORT WITH COUNTER INFORMATION

(75) Inventor: Andrew R. Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 618 days.

(21) Appl. No.: 11/608,657

(22) Filed: Dec. 8, 2006

(65) Prior Publication Data

US 2008/0137130 A1    Jun. 12, 2008

(51) Int. Cl.
*H04L 12/28* (2006.01)

(52) U.S. Cl. ...................... 370/426; 358/1.15

(58) Field of Classification Search ................. None
See application file for complete search history.

(56) References Cited

U.S. PATENT DOCUMENTS

| | | | |
|---|---|---|---|
| 6,367,992 B1* | 4/2002 | Aruga et al. | 400/76 |
| 6,795,829 B2 | 9/2004 | Alsop et al. | |
| 2002/0175208 A1 | 11/2002 | Bartley et al. | |
| 2003/0065759 A1 | 4/2003 | Britt et al. | |
| 2003/0074312 A1 | 4/2003 | White | |
| 2003/0090705 A1 | 5/2003 | Ferlitsch | |
| 2003/0133147 A1* | 7/2003 | Peeters | 358/1.15 |
| 2004/0141201 A1 | 7/2004 | Shima | |
| 2004/0190014 A1 | 9/2004 | Ferlitsch | |
| 2004/0225732 A1* | 11/2004 | Coons et al. | 709/224 |
| 2005/0071739 A1 | 3/2005 | Gava | |
| 2005/0111856 A1* | 5/2005 | Kawai | 399/8 |
| 2005/0271399 A1 | 12/2005 | Shigeta | |
| 2006/0206666 A1* | 9/2006 | Lambert et al. | 711/115 |

FOREIGN PATENT DOCUMENTS

| | | |
|---|---|---|
| EP | 1302884 | 4/2003 |
| EP | 1427135 | 6/2004 |
| EP | 1521195 | 4/2005 |
| JP | 2000-155509 | 6/2000 |
| JP | 2002341707 | 11/2002 |
| JP | 2003-186564 | 7/2003 |
| JP | 2004127314 | 4/2004 |
| JP | 2005-038351 | 2/2005 |
| JP | 2005-354233 | 12/2005 |
| JP | 2006-252084 | 9/2006 |

OTHER PUBLICATIONS

Office Action issued for Japanese Patent Application No. JP 2007-263492 on Feb. 2, 2010.
Published Amendment issued for Japanese Patant Publication No. JP 2005-354233 on Aug. 3, 2006.
Published Amendment issued for Japanese Patent Publication No. JP 2003-186564 on Nov. 10, 2005.

* cited by examiner

*Primary Examiner*—Pankaj Kumar
*Assistant Examiner*—Gautam Sharma
(74) *Attorney, Agent, or Firm*—Austin Rapp & Hardman

(57) ABSTRACT

A method for preparing a usage report with counter information relating to a device is described. A counter request is sent to a device. A determination is made if the device responds to the counter request. Cached counter information associated with the device is retrieved if the device does not respond to the counter request. The cached counter information is classified. The cached counter information is used in a usage report.

30 Claims, 7 Drawing Sheets

SYSTEMS AND METHODS FOR PREPARING A USAGE REPORT WITH COUNTER INFORMATION

TECHNICAL FIELD

The present invention relates generally to computers and computer-related technology. More specifically, the present invention relates to systems and methods for preparing a usage report with counter information.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals, a printer pool, a printer cluster, a fax machine, a plotter, a scanner, a logical device, an electronic whiteboard, a tablet PC, a computer monitor, a file, etc.

Different kinds of computer software facilitate the use of imaging devices. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

Imaging devices include counters that record the usage of the device by a particular entity, such as a customer, business, department, etc. Accounting systems use information provided by the counters to generate invoices, billing records, etc. The accounting systems receive counter information from operational devices during an accounting cycle. Benefits may be realized by providing systems and methods for preparing a usage report with counter information.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
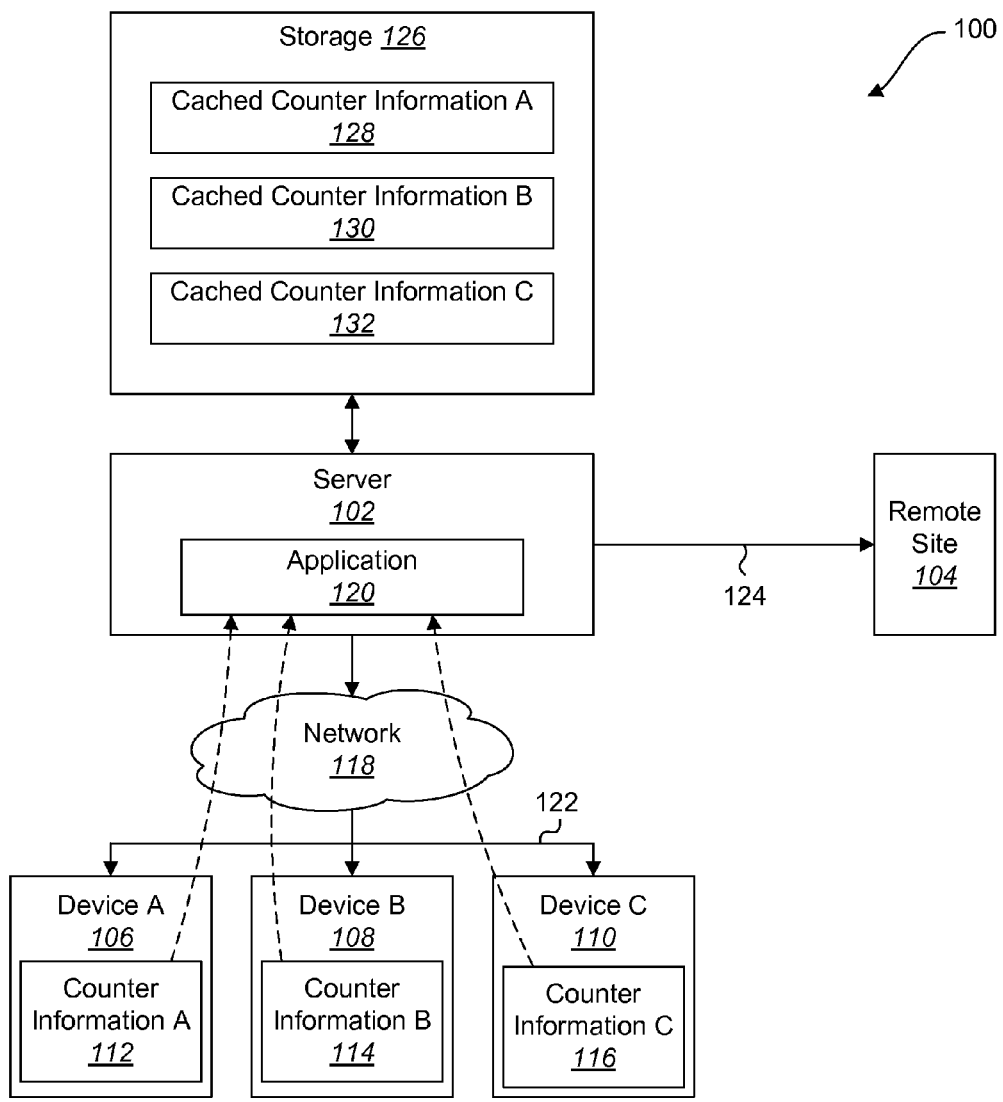
FIG. 1 is a block diagram illustrating an application obtaining counter information from a group of device.

A method for preparing a usage report with counter information relating to a device is described. A counter request is sent to a device. A determination is made if the device responds to the counter request. Cached counter information associated with the device is retrieved if the device does not respond to the counter request. The cached counter information is classified. The cached counter information is used in a usage report.

In one embodiment, the device is a multi-function printer (MFP). In one embodiment, determining if the device responds to the counter request comprises determining if the device is a non-operational device. A list may be generated that comprises the identification of the non-operational device. The cached counter information may be classified as real-time counter information or stale counter information. In one embodiment, the cached counter information is classified as real-time counter information if the device associated with the cached counter information supports a controlled shutdown. A determination may be made if the device possesses the capability to send counter information during a controlled shutdown of the device.

In one embodiment, the cached counter information is added to a first report or a second report depending on the classification. The first report and the second report may be combined to form the usage report. The usage report may be sent to a remote site. In one embodiment, the usage report comprises usage of the device associated with an account. In one embodiment, the usage report is sent to a remote site on a periodic reporting interval. The counter request may be sent to the one or more devices on a periodic collecting interval. In one embodiment, the periodic collecting interval is less than the periodic reporting interval. The one or more devices may not support a controlled shutdown.

A computer system that is configured to prepare a usage report with counter information relating to one or more devices is also described. The computer system includes a processor and memory in electronic communication with the processor. Instructions are stored in the memory. A counter request is sent to one or more devices. A determination is made if the one or more devices respond to the counter request. Cached counter information associated with the one or more devices is retrieved if the one or more devices do not respond to the counter request. The cached counter information is classified. The cached counter information is added to a first report or a second report depending on the classification. The first report and the second report are combined to form a usage report.

A computer-readable medium comprising executable instructions for preparing a usage report with counter information relating to one or more devices is also described. A counter request is sent to one or more devices. A determination is made if the one or more devices respond to the counter request. Cached counter information associated with the one or more devices is retrieved if the one or more devices do not respond to the counter request. The cached counter information is classified. The cached counter information is added to a first report or a second report depending on the classification. The first report and the second report are combined to form a usage report.

A method for initiating a physical shutdown of a device is also described. A logical shutdown of a device is initiated. A message is sent to an external program. One or more pre-shutdown processes are performed. A command is sent to the device to initiate a physical shutdown of the device.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device such as a non-transitory computer-readable storage medium. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Businesses may outsource projects such as copying, printing, scanning, facsimile services, etc. to printing businesses or similar types of establishments. In addition, corporations may share document generating devices or multi-functional printers/products/peripherals (MFPs) among different departments. Document generating devices and MFPs will be referred hereinafter as a device. In one embodiment, a device may include a copier, printer, scanner, facsimile machine, media card reader, hard disk, etc. Devices may include accounting features and systems to report different customer or department usage information. Such systems may include a set of counters associated with each account. Operations performed on the device, such as copying, printing, scanning, faxing, filing, publishing, conversion, displaying, etc. may be charged under a different account, thus increasing the counter associated with the account by one.

Accounting administrators may receive counter information that reports usage per account. Automated accounting systems may obtain counter information from devices. The accounting systems may send usage reports, which include the counter information, to accounting administrators for billing purposes at remote locations on a periodic reporting interval (e.g., daily, weekly, monthly, etc.) Thus, accounting administrators may not be required to obtain the counter information directly from the device. In one embodiment, the usage reports categorize the counter information by job type (e.g., copy, print, scan, etc.) and by resources used (e.g., paper size, color, staples, etc.) Accounting administrators may desire that automated accounting systems collect counter information from devices that may not be communicating with the accounting system at the time the counter information is collected.

In one embodiment, counter information may be collected by running an application on a server within a network of connected devices. The application may collect counter information on a periodic collecting interval. In one embodiment, the application is programmed to collect counter information on specific days. Alternatively, a system administrator may manually initiate the application to collect counter information. The system administrator may manually initiate the application on site or from a remote location. The counter information may be collected by the application and sent to a remote site, such as the site of an accounting administrator. However, if a device is not operating at the time the application collects the counter information, the information for that device may not be collected during that accounting cycle. The counter information for that device may be collected during a subsequent accounting cycle. In addition, if a device is permanently removed from the network between accounting cycles, the counter information accrued between the two accounting cycles may be lost.

In another embodiment, each device in the network is equipped with an internal application that is capable of sending counter information to a server application without being queried for such information. Generally, each such device is programmed when to send the counter information. When it is time to send the counter information, the device may gather its counter information, package it into an email and email the information to the server. The email data may be gathered either at an internal or external email server. The email server may extract the counter information and send the information to a remote site for billing purposes. However, if a device is not operational at the programmed time to send its counter information, the counter information may be delayed in being sent to the server until the device is in operation again. In addition, significant overhead may exist in programming each device when to send the counter information. If each device does not send their individual counter information at the same time, it may increase the difficulty of obtaining a complete periodic accounting report. Further, programming each device may necessitate each device to support the capability to send information. There may be no guarantee that all the email messages with counter information from the various devices will arrive, and there may be no guarantee that all the email messages with counter information for each device will arrive during the same time period. In addition, if a device is permanently removed from the network between accounting cycles, the counter information accrued between the two accounting cycles may be lost.

FIG. 1 is a block diagram 100 illustrating an application 120 obtaining counter information 112, 114, 116 from a group of devices 106, 108, 110. In one embodiment, the devices 106, 108, 110 are an MFP, such as a copier, printer, scanner, facsimile machine, media card reader, hard disk, etc. The application 120 may collect counter information 112, 114, 116 for each device 106, 108, 110 even if one or more of the devices 106, 108, 110 are not operational at the time the counter information 112, 114, 116 is collected. The application 120 may obtain counter information associated with imaging tasks such as printing, copying, scanning, faxing, filing, publishing, conversion, displaying, etc. The application 120 may also collect counter information at various detailed levels per device 106, 108, 110 depending on the capability of the device, such as duplex, paper size, toner usage, finishing (staples, punch, fold, cut, etc.), Page Description Language (PDL) interpreter, color, storage/size, etc. The application 120 may collect the counter information by any means, such as query the device using various protocols (e.g., simple network management protocol (SNMP), web page scrap, printer job language (PJL), etc.) and/or receive the counter information from the device (e.g., device initiates sending counter information to the application 120.)

The application 120 may be running on a server 102, and the server 102 may communicate with the devices 106, 108, 110 over a network 118. The network 118 may include a local-area network (LAN), a wide-area network (WAN), a campus-area network (CAN), a metropolitan-area network (MAN), a home-area network (HAN), a client/server network, a peer-to-peer network, an application-server network, the Internet, a paging network, a wireless network (e.g., WiFi, WiMax), a token ring network, an Ethernet network, etc. The devices 106, 108, 110 may send counter information 112, 114, 116 to the application 120 when a shutdown of the device 106, 108, 110 is initiated. In addition, the application 120 may send a counter request 122 to the devices 106, 108, 110 for the counter information 112, 114, 116 on a periodic collecting interval. Further, the application 120 may send a usage report 124 on a periodic reporting interval. The application 120 may send the usage report to the remote site 104 by any means, such as email, file transfer protocol (FTP), hypertext transfer protocol (HTTP), simple object access protocol (SOAP), extensible markup language (XML), etc. The usage report may include the counter information 112, 114, 116 for each device 106, 108, 110. The server 102 may send the usage report 124 to a remote site 104, such as a remote location at an accounting administrator's site. One or more of the devices 106, 108, 110 may not be operational when the application 120 desires to collect counter information. The application 120 may be enabled to collect the counter information 112, 114, 116 for non-operational devices in various ways.

In one embodiment, a device, such as device A 106, has the capability of detecting a controlled shutdown (i.e., a user initiated shutdown at the operational panel of device A 106). When a controlled shutdown is initiated, device A 106 may perform one or more shutdown related tasks before powering off. For example, one of the tasks may include sending current counter information for device A 106, such as counter information A 112, to the application 120. The application 120 may cache counter information it receives from devices during a controlled shutdown in a storage module 126. In one embodiment, counter information A 112 is cached as cached counter information A 128.

In another embodiment, the application 120 knows which devices do not have the capability to send counter information when a controlled shutdown is initiated. For these devices, the application 120 may send the counter request 122 and collect counter information on the periodic collecting interval, which may be less than the periodic reporting interval in which counter information is sent to the remote site 104. For example, the application 120 may know that device B 108 does not possess the capability to send counter information B 114 when a controlled shutdown of device B 108 is initiated. The application 120 may request device B 108 for counter information B 114 on a daily interval, while the application 120 sends a usage report 124 to the remote site 104 on a monthly interval. In one embodiment, counter information B 114 is cached as cached counter information B 130. Cached information may include counter information for a particular device, identification of the device and the date or time when the information was cached by the application 120. In one embodiment, cached counter information may also indicate if the device has the capability to send its counter information during a controlled shutdown.

In one embodiment, the application 120 sends the usage report 124 to the remote site 104 which may include real-time counter information for each device 106, 108, 110. A triggering event may cause the application 120 to prepare and send the usage report 124 to the remote site 104. For example, the periodic reporting interval may expire, the remote site 104 may send an automated request for the usage report, a system administrator may manually send a request for the usage report from the remote site 104, etc. In order to prepare the usage report, the application 120 may attempt to collect real-time counter information by sending the counter request 122 to each device 106, 108, 110. However, if a device is non-operational (i.e., powered down, powered off, shutdown, offline, etc.) the application 120 may not receive the real-time counter information for the non-operational device. The application 120 may access cached counter information for the non-operational device. If the cached counter information indicates that the counter information was received during a controlled shutdown of the non-operational device, the counter information is classified as real-time counter information and added to a responding device report. If the cached counter information indicates that the counter information was not received during a controlled shutdown of the non-operational device, the counter information may be classified as stale and added to a non-responding device report. Counter information classified as stale may indicate that the counter information is not up-to-date, real-time counter information for the non-operational device. The following illustration provides one embodiment of how the present systems and methods may be implemented.

Devices A and C 106, 110 may possess the capability to send their counter information, such as counter information A and C 112, 116 during a controlled shutdown. The application 120 may receive counter information A and C 112, 116 and cache the information as cached counter information A and C 128, 132. After devices A and C 106, 110 send their counter information to the application 120, they may complete the controlled shutdown and power off. At a later time, device C 110 may power back on while device A 106 remains powered off.

The application 120 may know that device B 108 does not possess the capabilities to send its counter information during a controlled shutdown. As such, the application 120 may send the counter request 122 to device B 108 for its counter information, such as counter information B 114, on a periodic collecting interval. Device B 108 may respond and send counter information B 114. The application 120 may cache the information as cached counter information B 130. At a later time, before the application 120 sends a subsequent counter request 122 in accordance with the periodic collecting interval, device B 108 may shutdown and power off.

In one embodiment, a triggering event occurs in which the application 120 prepares and sends the usage report 124 to the remote site 104. To prepare the usage report 124, the application 120 may send the counter request 122 to each device 106, 108, 110 in order to collect real-time counter information for each device. In this example, device A 106 and device B 108 may still be powered off and unable to respond to the request 122. Device C 110 may be operational and thus, may send its real-time counter information, such as counter information C 116, to the application 120 in response to the request 122. Counter information C 116 may be classified as real-time counter information and added to a responding device report.

The application 120 may retrieve cached counter information A 128 and cached counter information B 130. Cached counter information A 128 may indicate that device A 106 has the capability of sending its counter information during a controlled shutdown. As such, cached counter information A 128 may be classified as real-time counter information for device A 106. The cached information 128 may be added to the responding device report. Alternatively, cached counter information B 130 may indicate that device B 108 does not possess the capability of sending its counter information during a controlled shutdown. As such, cached counter information B 130 may be classified as stale counter information for device B 108. The cached information 130 may be added to the non-responding device report. The responding device report and the non-responding device report may be packaged in the usage report 124 and sent to the remote site 104 for accounting purposes (i.e., billing).

Figure 2:
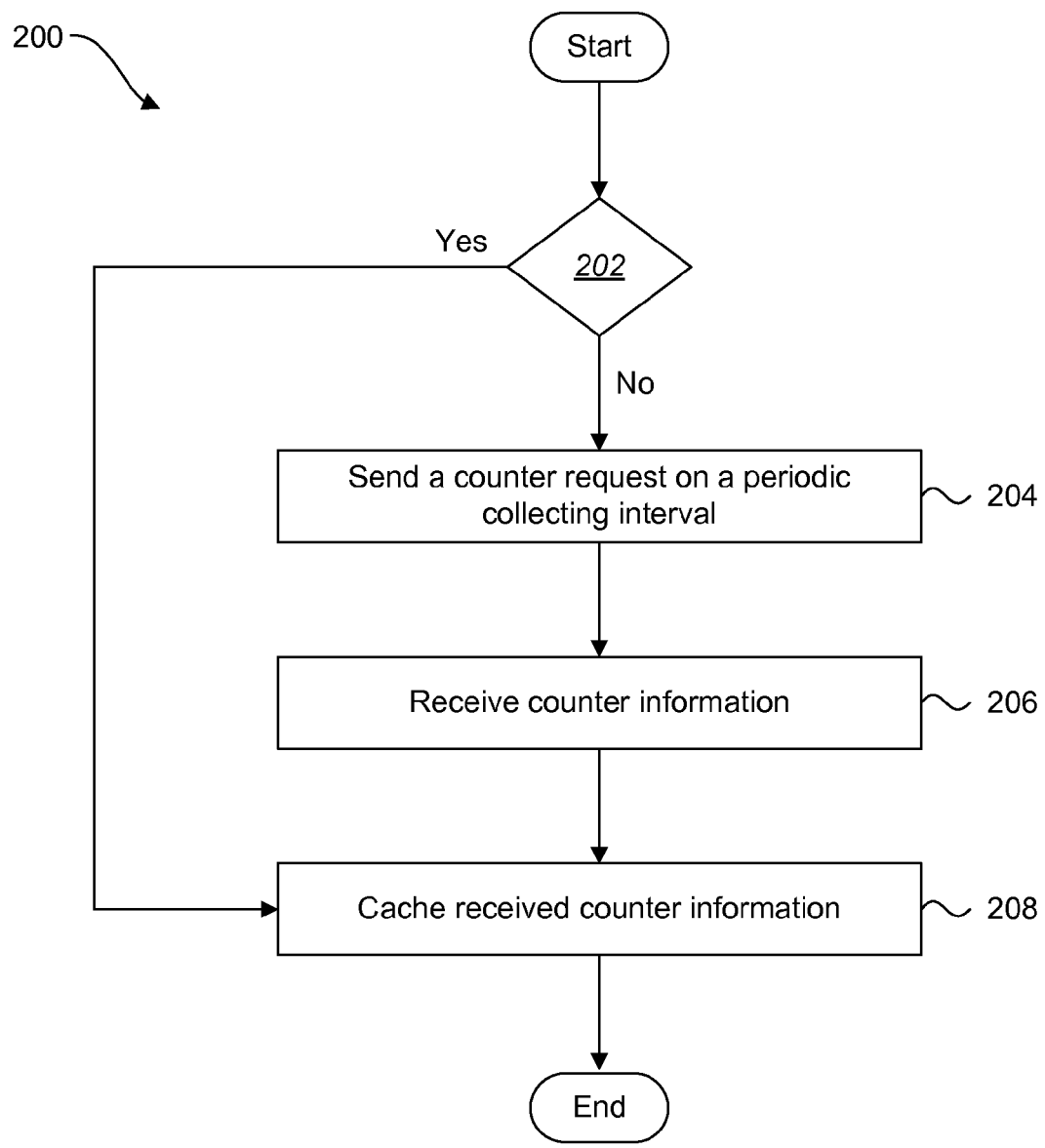
FIG. 2 is a flow diagram illustrating a method for collecting counter information for a device.

FIG. 2 is a flow diagram illustrating a method 200 for collecting counter information for a device. In one embodiment, the method 200 is implemented by the application 120 on the server 102. A determination 202 is made whether a device possesses the capabilities to send its counter information during a controlled shutdown of the device. In one embodiment, the determination 202 is made from a manual entry by a system operator, which indicates whether a particular device is capable of sending its counter information during a controlled shutdown. In another embodiment, registration of a device with the application 120 allows the application 120 to determine 202 whether the device is capable of sending its counter information during shutdown. In a further embodiment, the application 120 makes the determination 202 by discovering a device's model, type and/or capabilities. If the application 120 determines 202 that a device possesses the capabilities to send its counter information during shutdown of the device, counter information received from a device during a controlled shutdown may be cached 208.

If the application 120 determines 202 that a device does not possess the capabilities to send its counter information during shutdown of the device, a counter request is sent 204 to the device. In one embodiment, the request is sent 204 on a periodic collecting interval. The periodic collecting interval may occur more frequently than a periodic reporting interval in which counter information for one or more devices is sent to a remote site. Counter information may be received 206 from the device. Counter information received 206 in response to a counter request may be cached 208.

Figure 2A:
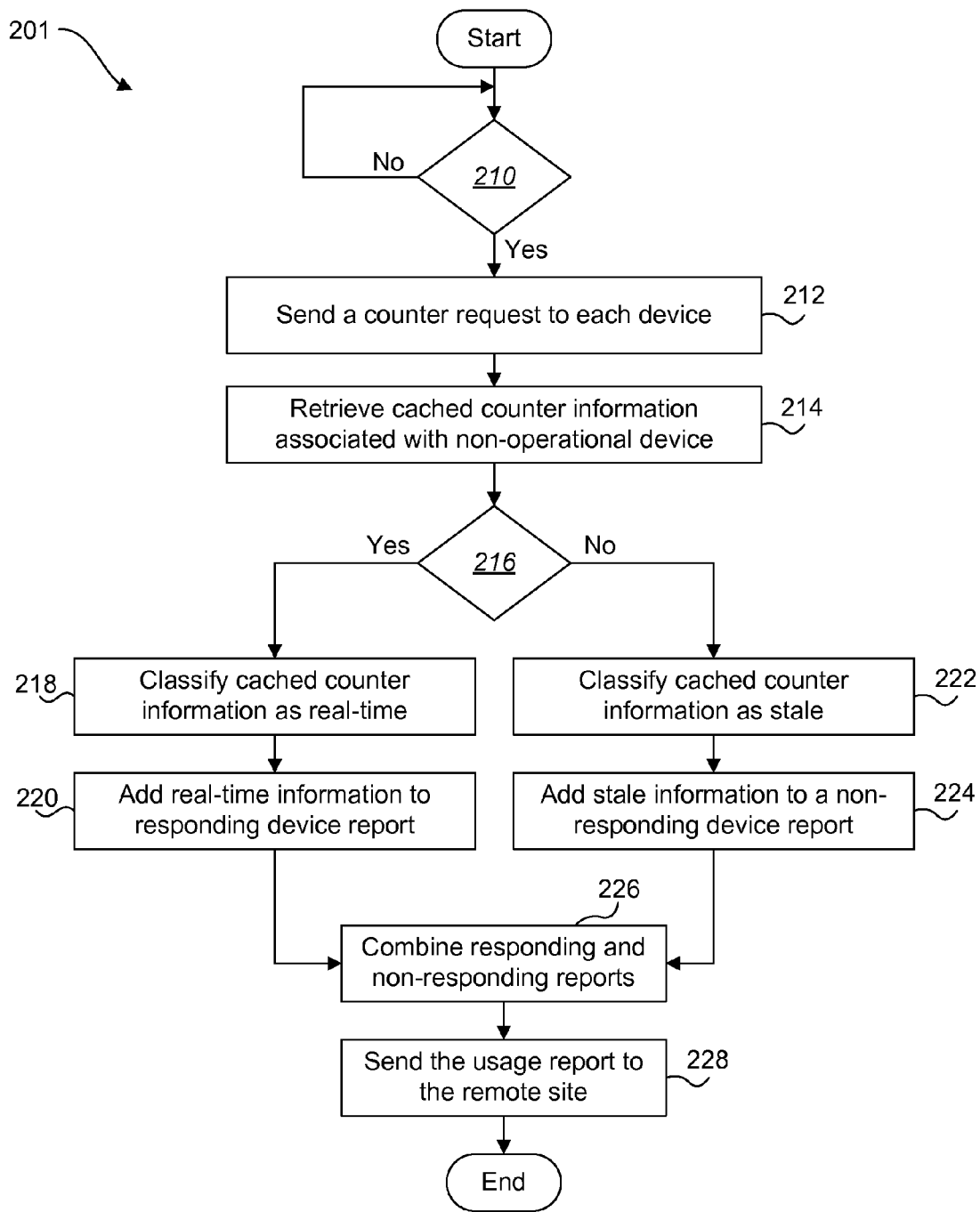
FIG. 2A is a flow diagram illustrating one embodiment of a method for preparing and sending a usage report to a remote site.

FIG. 2A is a flow diagram illustrating one embodiment of a method 201 for preparing and sending a usage report to a remote site. In one embodiment, the method 201 is implemented by the application 120. A determination 210 may be made whether a triggering event has occurred. Occurrence of the triggering event may indicate that the usage report should be prepared and sent to the remote site. In one embodiment, the application 120 may be preprogrammed with instructions that indicate how often (i.e. periodic reporting interval) the usage report should be prepared and sent to the remote site. For example, the application 120 may be preprogrammed with instructions to prepare and send the usage report to the remote site on a daily basis, weekly basis, monthly basis, etc. In another embodiment, a system operator of the remote site may manually invoke the application 120 to prepare and send the usage report. In another embodiment, the application 120 is remotely initiated to prepare and send the usage report, such as via a special email message. If no triggering event has occurred, the method 201 continues in a holding pattern. If a triggering event has occurred, a counter request may be sent 212 to each device in a system. The counter request may include a request for the counter information associated with each device.

Cached counter information associated with non-operational devices is retrieved 214. A non-operational device may include a device that does not respond to the counter request because it is powered down, offline, etc. A determination 216 may be made whether the device associated with the cached counter information possesses the capabilities to send its counter information during a controlled shutdown. If the device possesses the capabilities, the cached counter information may be classified 218 as real-time counter information and added 220 to the responding device report. Real-time cached counter information may indicate that the non-operational device associated with such real-time cached information does not include counter information that is different from the information previously cached. However, if the device does not possess the capabilities to send its counter information during a controlled shutdown, the cached counter information may be classified 222 as stale counter information. Stale counter information may indicate that the non-operational device associated with such stale counter information may include counter information that is different from counter information previously cached. The stale counter information may be added 224 to a non-responding device report. In one embodiment, the responding device report and the non-responding device report may be combined 226 into the usage report. The usage report may be sent 228 to the remote site. In one embodiment, the usage report indicates the quantity of usage of a particular device by a particular account, customer, etc. The remote site may perform actions on the usage report, such as generating a billing invoice for an account based on the usage of the device.

Figure 3:
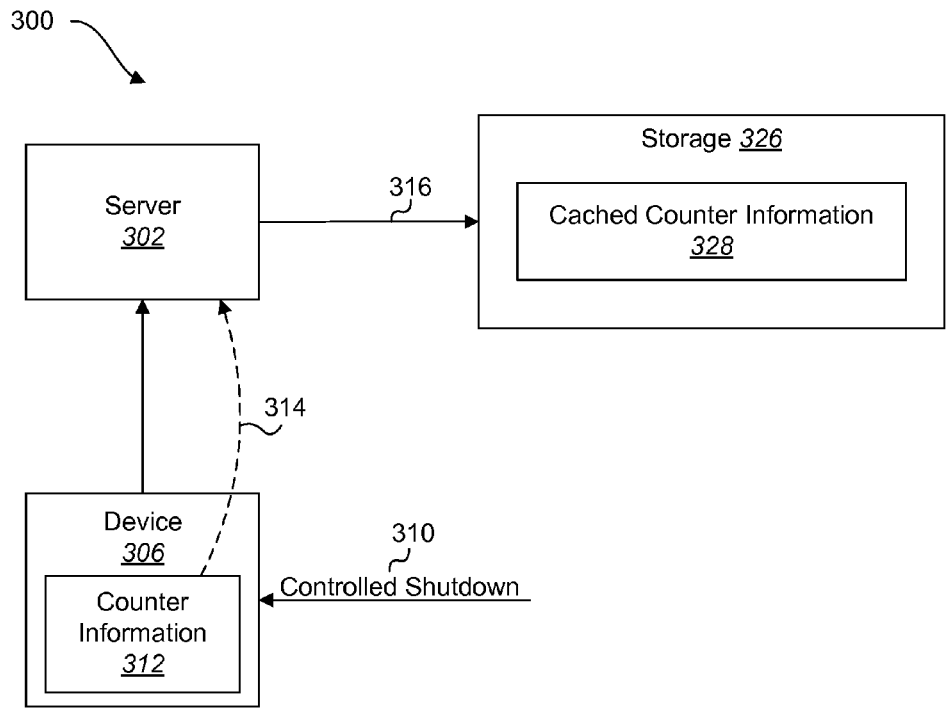
FIG. 3 is a block diagram illustrating one embodiment of a device pushing its counter information to a server during a controlled shutdown.

FIG. 3 is a block diagram illustrating one embodiment 300 of a device 306 pushing 314 its counter information 312 to a server 302 during a controlled shutdown 310. One or more devices 306 may include the capabilities to perform programmatic functions at shutdown. The programmatic functions may be preprogrammed in the device 306, registered on the device 306, such as a program loaded in a guest/virtual operating system (OS) (e.g., Java) and/or executed on a remote host. In one embodiment, a shutdown program is implemented to collect counter information 312 associated with the device 306 at the time of shutdown. The counter information 312 may be pushed (i.e. sent) 314 to the application 120 on the server 302. The shutdown programs may be internal to the device 306. A system operator may program the device 306 to run a shutdown program during the controlled shutdown 310 of the device 306. The operator may also set parameters associated with the shutdown program which may include what counter information to collect, where to send the counter information (e.g., host/port) and the method or protocol used to send the counter information (e.g., Simple Object Access Protocol (SOAP), Extensible Markup Language (XML), etc.)

In one embodiment, the shutdown program is an independent program that is loaded on the device 306, and is capable of running within the OS of the device 306, such as a Java program running in a Java Virtual Machine (JVM). In another embodiment, the operator loads shutdown profiles on the device 306. The device 306 may have limited capabilities and the profiles may include sending a command code to a specified host (i.e. the server 302) and delaying the shutdown of the device 306 until receipt of a release command code from the specified host. The command code sent to the specified host may be used to cause the application 120 to collect counter information from the device 306. Once completed, the application 120 on the host may send the release command code back to the device 306 and the device 306 may proceed with the controlled shutdown 310. For example, a user of the device may initiate a logical shutdown of the device 306. The logical shutdown of the device 306 may cause a message to be sent to an external program. In one embodiment, the external program performs pre-shutdown processes and the external program sends a command to the device 306 to initiate a physical shutdown. Examples of pre-shutdown processes may include collecting job accounting information, collecting information relating to the overall status/condition of the device (including past problems experienced by the device), collecting internal accounting information, running a diagnostic pass on the device, etc.

Once the server 302 receives the counter information 312, the application 120 may cache 316 the counter information as cached counter information 328. The counter information 312 may be stored in a storage module 326. The storage module 326 may be included on the server 302. The cached counter information 328 may include the counter information 312, the identification of the device 306 (e.g., communication address, model, serial number, network name, etc.) and the date/time of the shutdown of the device 306.

Figure 4:
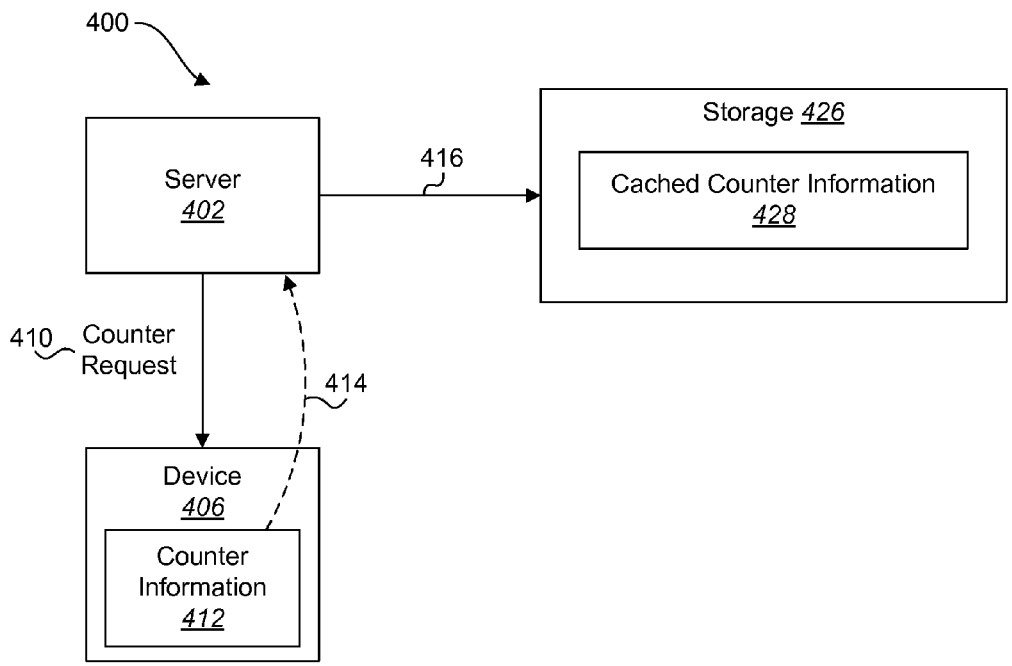
FIG. 4 is a block diagram illustrating one embodiment of a server sending a counter request on periodic collecting intervals.

FIG. 4 is a block diagram illustrating one embodiment 400 of a server 402 sending a counter request 410 on periodic collecting intervals. In one embodiment, the application 120 (not shown) on the server 402 determines if a device 406 has the capabilities to send counter information 412 during a controlled shutdown. The application 120 may determine this by evaluating a manual entry of the device's 406 capabilities by a system operator, registration of the device 406, discovering and determining the model, type, and/or capabilities of the device 406. If the device 406 does not report its counter information 412 during a controlled shutdown, the application 120 may periodically collect counter information on a periodic collecting interval by sending the counter request 410 to the device 406. The device 406 may respond to the request 410 by sending 414 its counter information 412. As previously stated, the periodic collecting interval may be less than a periodic reporting interval of reporting the counter information to a remote site. For example, the periodic reporting interval may be on a monthly basis, and the periodic collecting interval may be on a daily basis. The application 120 on the server 402 may cache 416 the counter information 412 as cached counter information 428. For example, the counter information 412 may be cached in a storage module 426. The cached counter information 428 may include the counter information 412, the identification of the device 406 (e.g., communication address, model, serial number, network name, etc.) and the date/time of the collecting of the counter information 412 on the periodic collecting interval.

Figure 5:
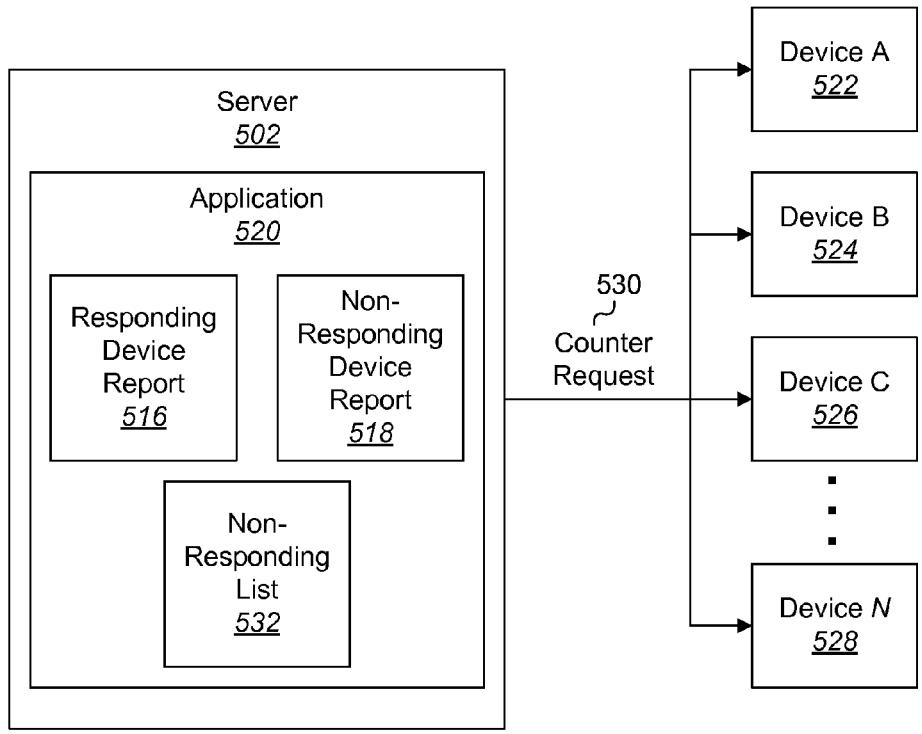
FIG. 5 is a block diagram illustrating one embodiment of preparing a responding device report and a non-responding device report which may be used to generate a usage report.

FIG. 5 is a block diagram illustrating one embodiment of preparing a responding device report 516 and a non-responding device report 518 which may be used to generate a usage report. In one embodiment, a triggering event indicates to an application 520 included on the server 502 that a usage report should be prepared and sent to the remote site. For example, the application 520 may periodically prepare and send the usage report to the remote site. The usage report may include real-time counter information for devices 522, 524, 526, 528 included in a system. The usage report may be prepared and sent on periodic reporting interval, which may be any periodic interval (e.g., daily, weekly, monthly, etc.) The periodic reporting interval may be a fixed or variable interval. When the triggering event occurs, the application 520 may attempt to collect real-time counter information for each device 522, 524, 526, 528 by sending a counter request 530. While only four devices 522, 524, 526, 528 are illustrated, it is to be understood that more or less devices may exist in a system.

In one embodiment, the application 520 creates two reports, a responding device report 516 and a non-responding device report 518. The responding device report 516 may include counter information from each device that responds to the counter request 530. The non-responding device report 518 may be a placeholder file for counter information associated with each device that does not respond to the counter request 530. In one embodiment, the application 520 also generates a non-responding device list 532, which indicates the identity of each device that did not respond to the request 530.

Figure 6:
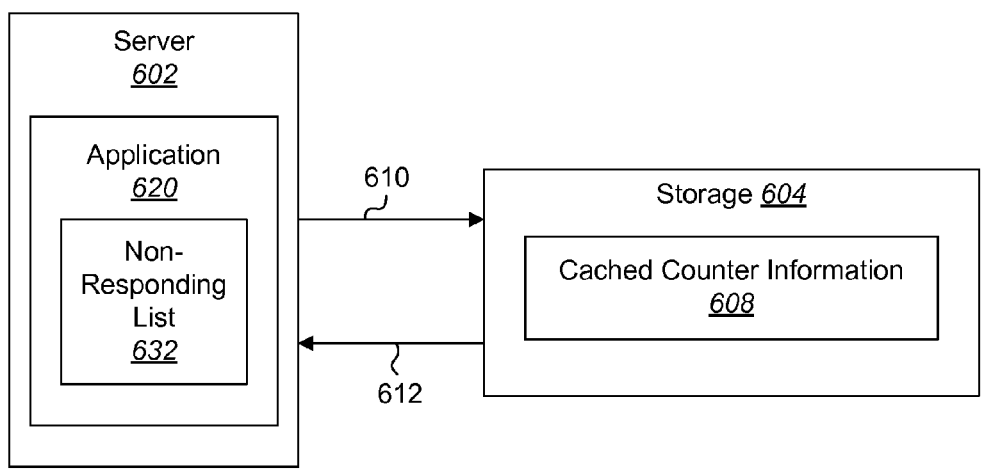
FIG. 6 is a block diagram illustrating one embodiment of an application on a server obtaining counter information associated with non-operational devices.

FIG. 6 is a block diagram illustrating one embodiment of an application 620 on a server 602 obtaining counter information associated with non-operational devices. In one embodiment, the application 620 includes a non-responding list 632, which includes the identity of each device that did not respond to a request for its real-time counter information. The application 620 may send a cache request 610 to a storage module 604 in order to retrieve cached counter information 608 associated with each non-operational device included in the list 632. The cached counter information 608 may be sent 612 to the application 620. The cached counter information 608 may be analyzed in order to determine whether it may be classified as real-time counter information or stale counter information.

Figure 7:
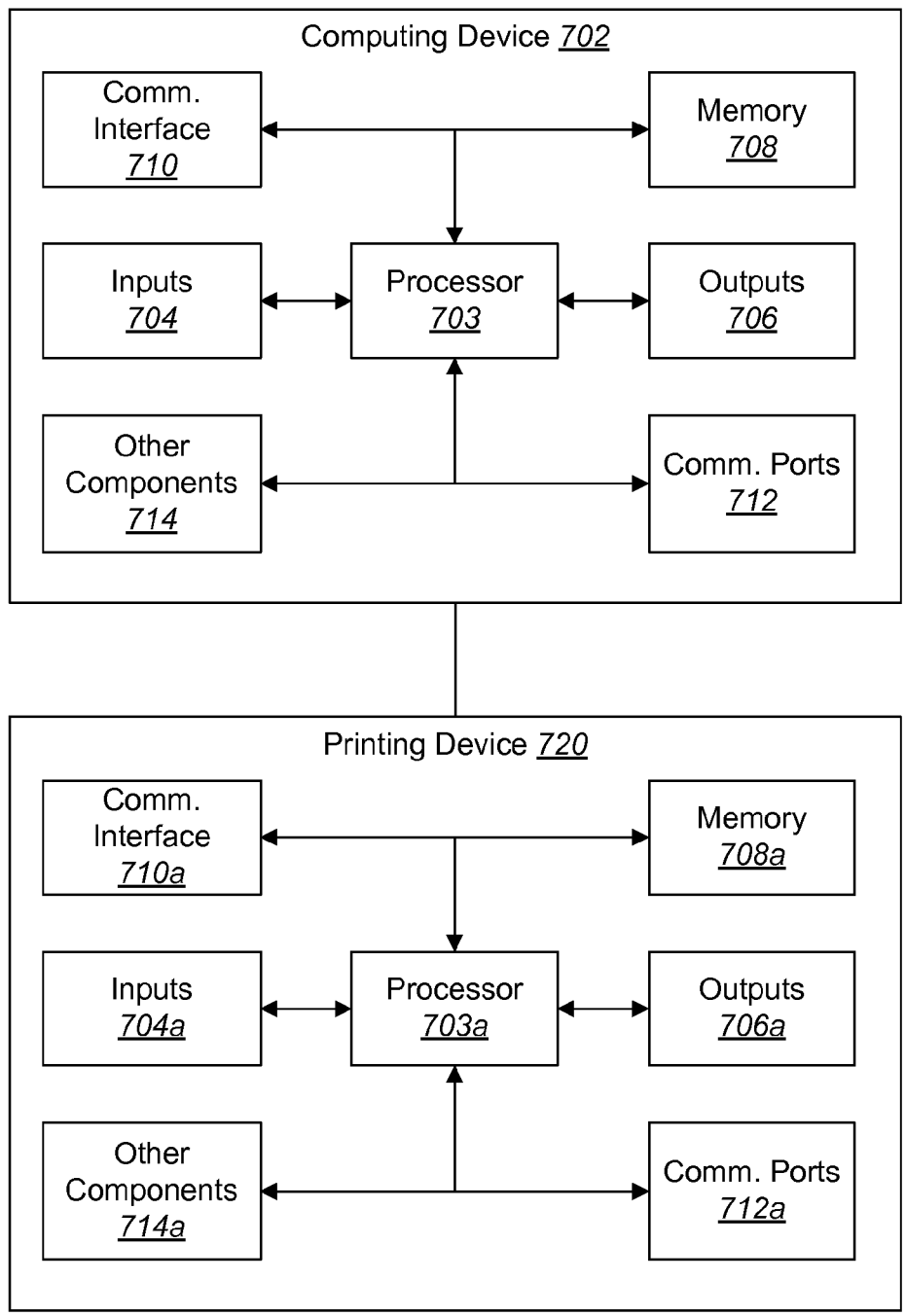
FIG. 7 is a block diagram illustrating the major hardware components typically utilized with embodiments herein.

FIG. 7 is a block diagram illustrating the major hardware components typically utilized with embodiments herein. The systems and methods disclosed may be used with a computing device 702 and a printing device 720. The major hardware components typically utilized in a computing device 702 are illustrated in FIG. 7. A computing device 702 typically includes a processor 703 in electronic communication with input components or devices 704 and/or output components or devices 706. The processor 703 is operably connected to input 704 and/or output devices 706 capable of electronic communication with the processor 703, or, in other words, to devices capable of input and/or output in the form of an electrical signal. Embodiments of devices 702 may include the inputs 704, outputs 706 and the processor 703 within the same physical structure or in separate housings or structures.

The computing device 702 may also include memory 708. The memory 708 may be a separate component from the processor 703, or it may be on-board memory 708 included in the same part as the processor 703. For example, microcontrollers often include a certain amount of on-board memory.

The processor 703 is also in electronic communication with a communication interface 710. The communication interface 710 may be used for communications with other devices 702, printing devices 720, servers, etc. Thus, the communication interfaces 710 of the various devices 702 may be designed to communicate with each other to send signals or messages between the computing devices 702.

The computing device 702 may also include other communication ports 712. In addition, other components 714 may also be included in the computing device 702.

Many kinds of different devices may be used with embodiments herein. The computing device 702 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 7 is only meant to illustrate typical components of a computing device 702 and is not meant to limit the scope of embodiments disclosed herein.

The computing device 702 is in electronic communication with the printing device 720. A printing device 720 is a device that receives or transmits an imaging job, such as a Multi-Function Peripheral ("MFP") or computing device. Printing devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. A typical printing device, such as a physical printer, fax machine, scanner, multi-functional peripheral or copier is a type of computing device. As a result, it also includes a processor, memory, communications interface, etc., as shown and illustrated in relation to FIG. 7. The printing device may be a single or a plural grouping (e.g., pool or cluster) of two or more devices.

Figure 8:
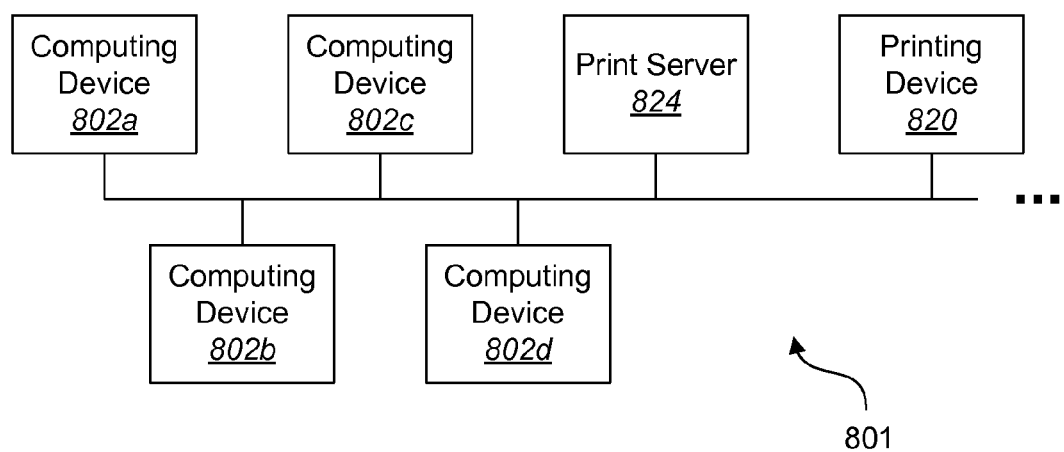
FIG. 8 is a network block diagram illustrating one possible environment in which the present systems and methods may be implemented.

FIG. 8 is a network block diagram illustrating one possible environment in which the present systems and methods may be implemented. The present systems and methods may also be implemented on a standalone computer system. FIG. 8 illustrates a computer network 801 comprising a plurality of computing devices 802, a printing device 820 and a print server 824.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for preparing a usage report with counter information relating to a device, the method comprising:
   sending a counter request to a device;
   determining if the device responds to the counter request;
   retrieving cached counter information associated with the device if the device does not respond to the counter request and not retrieving the cached counter information associated with the device if the device does respond to the counter request;
   classifying the cached counter information; and
   using the cached counter information in a usage report.

2. The method of claim 1, wherein the device is a multi-function printer (MFP).

3. The method of claim 1, wherein determining if the device responds to the counter request comprises determining if the device is a non-operational device.

4. The method of claim 3, further comprising generating a list that comprises the identification of the non-operational device.

5. The method of claim 1, further comprising classifying the cached counter information as real-time counter information or stale counter information.

6. The method of claim 5, wherein the cached counter information is classified as real-time counter information if the device associated with the cached counter information supports a controlled shutdown.

7. The method of claim 1, further comprising determining if the device possesses the capability to send counter information during a controlled shutdown of the device.

8. The method of claim 1, further comprising:
adding the cached counter information to a first report or a second report depending on the classification;
combining the first report and the second report to form the usage report; and
sending the usage report to a remote site.

9. The method of claim 1, wherein the usage report comprises usage of the device associated with an account.

10. The method of claim 1, further comprising sending the usage report to a remote site on a periodic reporting interval.

11. The method of claim 1, further comprising sending the counter request to one or more devices on a periodic collecting interval.

12. The method of claim 11, wherein the periodic collecting interval is less than the periodic reporting interval.

13. The method of claim 11, wherein the one or more devices do not support a controlled shutdown.

14. A computer system that is configured to prepare a usage report with counter information relating to one or more devices, the computer system comprising:
a processor;
memory in electronic communication with the processor;
instructions stored in the memory, the instructions being executable to:
send a counter request to one or more devices;
determine if the one or more devices respond to the counter request;
retrieve cached counter information associated with the one or more devices if the one or more devices do not respond to the counter request and not retrieve the cached counter information associated with the one or more devices if the one or more devices do respond to the counter request;
classify the cached counter information;
add the cached counter information to a first report or a second report depending on the classification; and
combine the first report and the second report to form a usage report.

15. The computer system of claim 14, wherein the device is a multi-function printer (MFP).

16. The computer system of claim 14, wherein the instructions are further executable to determine if the one or more devices is a non-operational device.

17. The computer system of claim 14, wherein the instructions are further executable to classify the cached counter information as real-time counter information or stale counter information.

18. The computer system of claim 17, wherein the cached counter information is classified as real-time counter information if the one or more devices associated with the cached counter information supports a controlled shutdown.

19. The computer system of claim 14, wherein the instructions are further executable to determine if the one or more devices possess the capability to send counter information during a controlled shutdown of the one or more devices.

20. The computer system of claim 14, wherein the instructions are further executable to send the usage report to a remote site.

21. The computer system of claim 14, wherein the usage report comprises usage of the device associated with an account.

22. The computer system of claim 14, wherein the instructions are further executable to send the usage report to a remote site on a periodic reporting interval.

23. The computer system of claim 14, wherein the instructions are further executable to send the counter request to the one or more devices on a periodic collecting interval.

24. The computer system of claim 23, wherein the periodic collecting interval is less than the periodic reporting interval.

25. The computer system of claim 23, wherein the one or more devices do not support a controlled shutdown.

26. A non-transitory computer-readable storage medium comprising executable instructions for preparing a usage report with counter information relating to one or more devices, the instructions being executable to:
send a counter request to one or more devices;
determine if the one or more devices respond to the counter request;
retrieve cached counter information associated with the one or more devices if the one or more devices do not respond to the counter request and not retrieve the cached counter information associated with the one or more devices if the one or more devices do respond to the counter request;
classify the cached counter information;
add the cached counter information to a first report or a second report depending on the classification; and
combine the first report and the second report to form a usage report.

27. A method for initiating a physical shutdown of a device, the method comprising:
initiating a logical shutdown of a device;
sending a message to an external program;
performing one or more pre-shutdown processes, wherein the one or more pre-shutdown processes are performed by the external program; and
sending a command to the device to initiate a physical shutdown of the device, wherein the one or more pre-shutdown processes comprises:
sending a counter request to a device;
determining if the device responds to the counter request;
retrieving cached counter information associated with the device if the device does not respond to the counter request and not retrieving the cached counter information associated with the device if the device does respond to the counter request;
classifying the cached counter information; and
using the cached counter information in a usage report.

28. The method of claim 27, wherein the one or more pre-shutdown processes comprises collecting job accounting information.

29. The method of claim 27, wherein the one or more pre-shutdown processes comprises collecting information relating to the overall status and condition of the device.

30. The method of claim 27, wherein the one or more pre-shutdown processes comprises running a diagnostic pass on the device.

* * * * *